United States Patent [19]

Smith

[11] 3,857,788

[45] Dec. 31, 1974

[54] SEDIMENTATION APPARATUS WITH PLURAL SLUDGE DISCHARGE FEATURE

[75] Inventor: Eugene J. Smith, Valley Cottage, N.Y.

[73] Assignee: General Signal Corporation, Rochester, N.Y.

[22] Filed: Apr. 27, 1973

[21] Appl. No.: 355,114

[52] U.S. Cl............... 210/520, 210/523, 210/532 R
[51] Int. Cl............................................ B01d 21/24
[58] Field of Search ........... 210/532, 530, 221, 258, 210/520, 405, 523

[56] References Cited
UNITED STATES PATENTS

| | | | |
|---|---|---|---|
| 2,854,146 | 9/1958 | Nebolsine et al.................. | 210/532 |
| 3,235,083 | 2/1966 | Sontheimer et al................ | 210/530 |
| 3,589,519 | 6/1971 | Bendel.............................. | 210/530 |

*Primary Examiner*—Roy Lake
*Assistant Examiner*—Craig R. Feinberg
*Attorney, Agent, or Firm*—Jeffrey S. Mednick

[57] ABSTRACT

A liquid sewage treatment sedimentation tank or clarifier unit, preferably such type of tank as is used in a secondary stage treatment of sewage, is provided with a sludge lifting tube assembly which effects an airlift withdrawal of sludge from a sludge collection hopper in the bottom of the tank. A rotating spout connected to the lifting tube assembly discharges the sludge into an annular trough being provided with means therein to apportionately distribute flow therefrom to a sludge recovery operation and/or a waste sludge operation.

8 Claims, 5 Drawing Figures

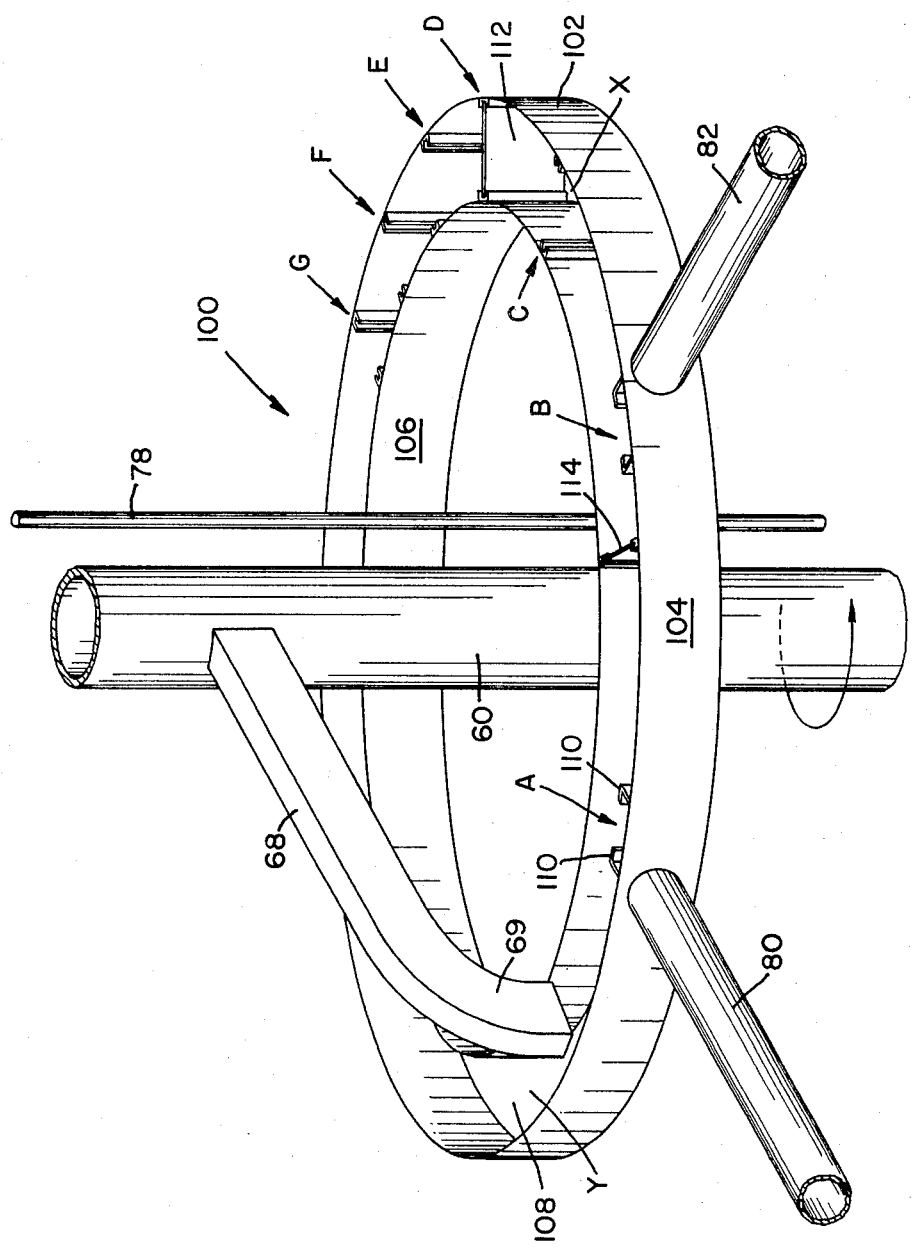

SEDIMENTATION APPARATUS WITH PLURAL SLUDGE DISCHARGE FEATURE

Liquid sewage can be treated in various known manners to remove solid pollutants from the sewage, thereby facilitating ultimate discharge from the treatment system of a clean effluent to a stream or to another source of recovery operation of the liquid phase of the sewage. Such treatment of the liquid sewage can involve a primary treatment wherein certain solid materials or trash present in the liquid sewage are removed in a screening operation followed by settlement of certain of the heavier suspended particles in the sewage as a sludge in a primary stage sedimentation tank from whence such primary sludge is conveyed to a disposal operation. From the primary treatment stage the remaining liquid solids containing sewage is passed to a secondary stage treatment involving passage thereof through aeration tanks wherein a biologic oxidation of the sewage occurs involving the oxidation (by means of aerobic bacteria) of certain of the remaining solids in the sewage to convert them to an activated sludge, an aeration procedure being employed to accelerate the oxidation process. Following treatment in the secondary stage aeration tanks, the secondary or activated sludge containing liquid sewage is pumped into a secondary sedimentation tank wherein a considerable quantity of the activated sludge is settled out from the liquid phase and removed from the secondary sedimentation tank by discharge to the sludge recovery operation and/or to a waste sludge operation. In the former instance, it is desirable that the recovered secondary sludge be returned to the secondary treatment aeration tanks since such secondary sludge is still biologically active and can be used for the purpose of enriching the liquor in the aeration tanks to thereby foster the production of the aerobic bacteria necessary for effecting the oxidation of the solids entering the aeration tanks. The waste sludge discharge from the secondary sedimentation tank can be to any suitable sludge disposal operation including, for example, burning of the waste sludge to ash for purposes such as landfill, etc. Depending upon the particular operating conditions of the treatment system, it is desirable to simply and conveniently alter or apportion the quantities of secondary sludge being discharged to the sludge recovery operation and to the sludge disposal waste operation.

The present invention provides apparatus in a secondary sedimentation tank in a sewage treatment system which can be used for distributing the discharge of secondary sludge from the tank to a sludge recovery operation or to a waste sludge disposal operation. In the former, activated sludge is returned to the secondary aeration tanks, whereas, discharge of the waste sludge can be to a suitable waste disposal operation.

Other objects of the present invention will in part be obvious and will in part appear hereinafter.

In accordance with the present invention, the secondary sedimentation tank of a liquid sewage treatment system is provided with sludge discharge and apportioning apparatus in the form of a sludge lifting tube assembly and a spout connected thereto. Both are mounted on the conventional rotary raking structure provided in such types of tanks and unitarily rotatable therewith. The sludge lifting tube assembly includes an upright pipe structure having suction branch which rotates in a sludge hopper in the bottom of the tank wherein sludge is collected by the action of the raking structure. The spout may discharge the sludge above the fluid level in the tank. A source of compressed air is provided and compressed air therefrom is introduced into the pipe structure of the sludge lifting tube assembly to produce an airlift withdrawal of sludge from the sludge hopper into the lifting tube assembly and outwardly from the spout. The apparatus further includes means for distributing or portioning the sludge from the lifting tube assembly to first and second conduits connected with the tank and associated, respectively, with the sludge recovery and waste sludge operations. Such distributing means is provided in the form of an annular trough fixed in the tank and encircling the upper or discharge end of the sludge lifting tube assembly, the aforementioned first and second conduits being communicatively connected with the trough space. As the sludge lifting tube assembly and the spout rotates in unison with the rotary raking structure, the discharge of sludge therefrom is into the trough space. Means are provided in the trough for the removable reception therein of flow control plates to selectively apportionately control the outflow of sludge from the trough through the respective first and second conduits.

Such flow control plates may be positioned in the trough in positions blocking off fully the flow to the entrance opening of the sludge recovery conduit or the waste sludge conduit. On the other hand, if it is desired to have particular levels of flow to both, flow control plates can be employed to separate the trough into two separate collection spaces with one each of the two separate collection spaces communicating with one of the sludge recovery and waste sludge conduits. As the sludge lifting tube assembly rotates and discharges sludge into the trough, and depending upon the positioning of the apportioning flow control plates therein, the sludge discharge to recovery can be, for example, 75 percent, whereas, 25 percent would be directed to the sludge waste discharge. Depending upon the selective positioning of the flow control plates, any one or a range of apportioned quantities can be delivered to the respective conduits.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in conjunction with the accompanying drawings, in which:

FIG. 5 is a perspective view of the means used for discharging sludge from the sludge pick-up means between the sludge recovery and waste sludge conduits respectively, the spout being shown in the manner in which it rotates to discharge sludge therefrom into the annular trough.

Throughout the description like reference numerals are used to denote like parts in the drawings.

The apparatus of the present invention is described in terms of its use in a secondary sedimentation tank of a sewage treatment system. However, it will be apparent that its utilization is broader and that it can be used in any type of sedimentation tank wherein it is desirable to remove settled solids from the bottom of such tanks and discharge such solids therefrom in apportioned quantities to one or more separate recovery or discharge operations in the system.

Figure 1:
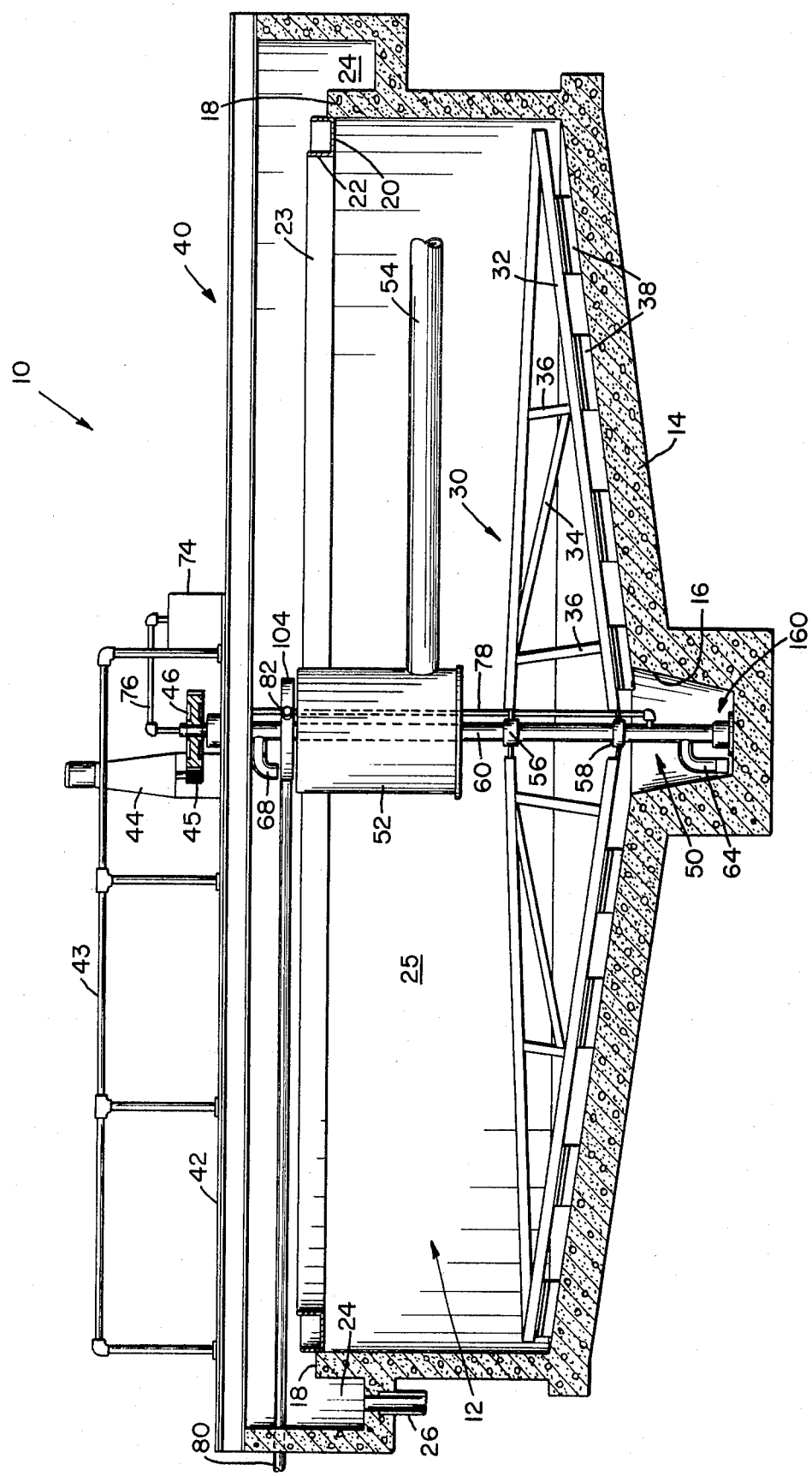
FIG. 1 is a elevational view of sedimentation apparatus constructed in accordance with the principles of the present invention, certain parts being shown in section, the depicted apparatus being a secondary sedimentation tank.
Figure 2:
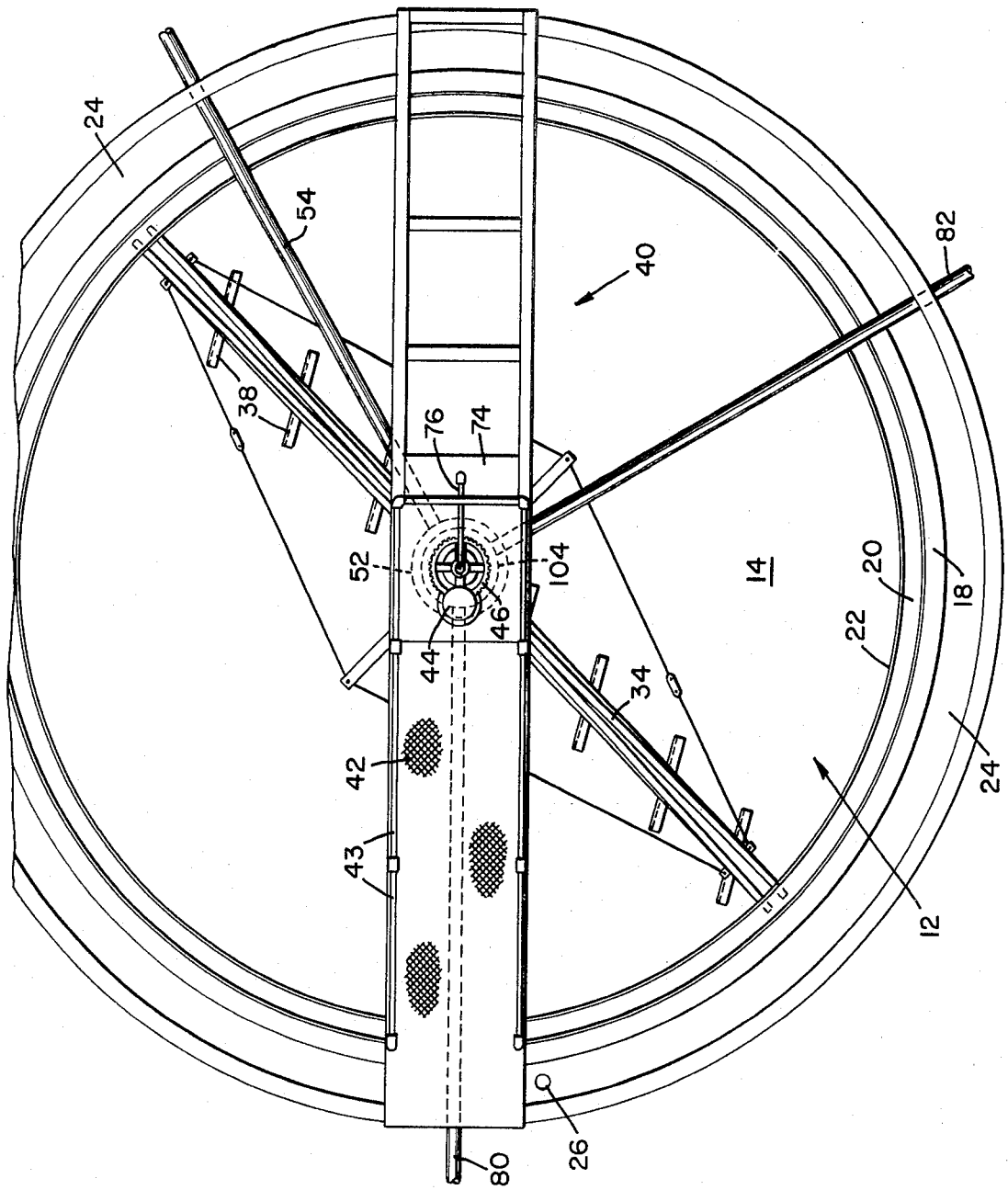
FIG. 2 is a plan view of the apparatus depicted in FIG. 1, certain portions being broken away for purposes of clarity.

Referring now more particularly to FIGS. 1 and 2, there is depicted therein sedimentation apparatus and more particularly a secondary sedimentation unit 10 which includes a tank 12 having a base 14 which is inclined inwardly and downwardly to juncture with a centrally located sludge hopper 16, the tank 12 having at the periphery of the base 14 an encircling upstanding wall 18 and therewith providing a large retention space for receiving solids containing sewage. Located in the tank and adjacent the upstanding side wall 18 of the tank and disposed at the top inner periphery thereof, is a trough-like structure comprising a scum well 20 into which effluent overflow from the main pool 25 of sewage in the tank discharges over the adjustable weir plate 22 thereon, the latter defining, inter alia, a tank fluid level 23, with there being provided further a suitable skimming unit (not shown) which functions in known manner to remove scum from the surface of the liquid pool resident in the scum well so that the effluent which overflows from the scum well 20 to the peripheral clarified effluent well 24 encircling the upper part of the tank wall 18 is substantially clear. Such clear effluent may then be outflowed in known manner from the effluent reuse or it can, if neutralized and chlorinated, be discharged to a stream.

The sedimentation tank also is provided with a rotary raking structure depicted generally at 30 and which comprises the customary raking arms 32, interconnected structural supporting components 34, 36 and further including supported at the bottom of the raking arms 32, a number of squeegee-type rakes 38, the aforementioned structure being of known construction. As will be noted particularly in FIG. 1, the rotary raking structure 30 is in accordance with the present invention mounted for unitary rotation with the sludge lifting tube assembly 50 to be more fully described presently. During the course of the rotation of the rotary raking structure 30, it functions in the usual manner to displace through raking action solids which have settled out of the liquid sewage in the tank 12 and collected as a sludge on the bottom 14 of the tank, the solids being displaced by the rakes 38 moving such solids radially inwardly of the tank to ultimate deposit within the sludge hopper 16. Supported at the top of the rotary raking structure 30 and the sludge lifting tube assembly 50 is a bridge member 40 of conventional construction including the customary walkway 42, handrail 43, and mounting thereon an electric drive motor 44 for powering gear pinion 45 which in turn is in engagement with bull gear 46 for rotating the rotary raking structure 30 and sludge lifting tube assembly 50.

Disposed within the tank 12 and fixed therein in a path encircling the suction lifting tube assembly 50 is a diffusion well 52 which is in open communication with the tank, and provides a means for entry of solids containing liquid sewage which enters the tank through the influent conduit 54, in the manner depicted, such influent, for example, being supplied from the secondary stage aeration tanks and having therein activated sludge.

Figures 3, 4:
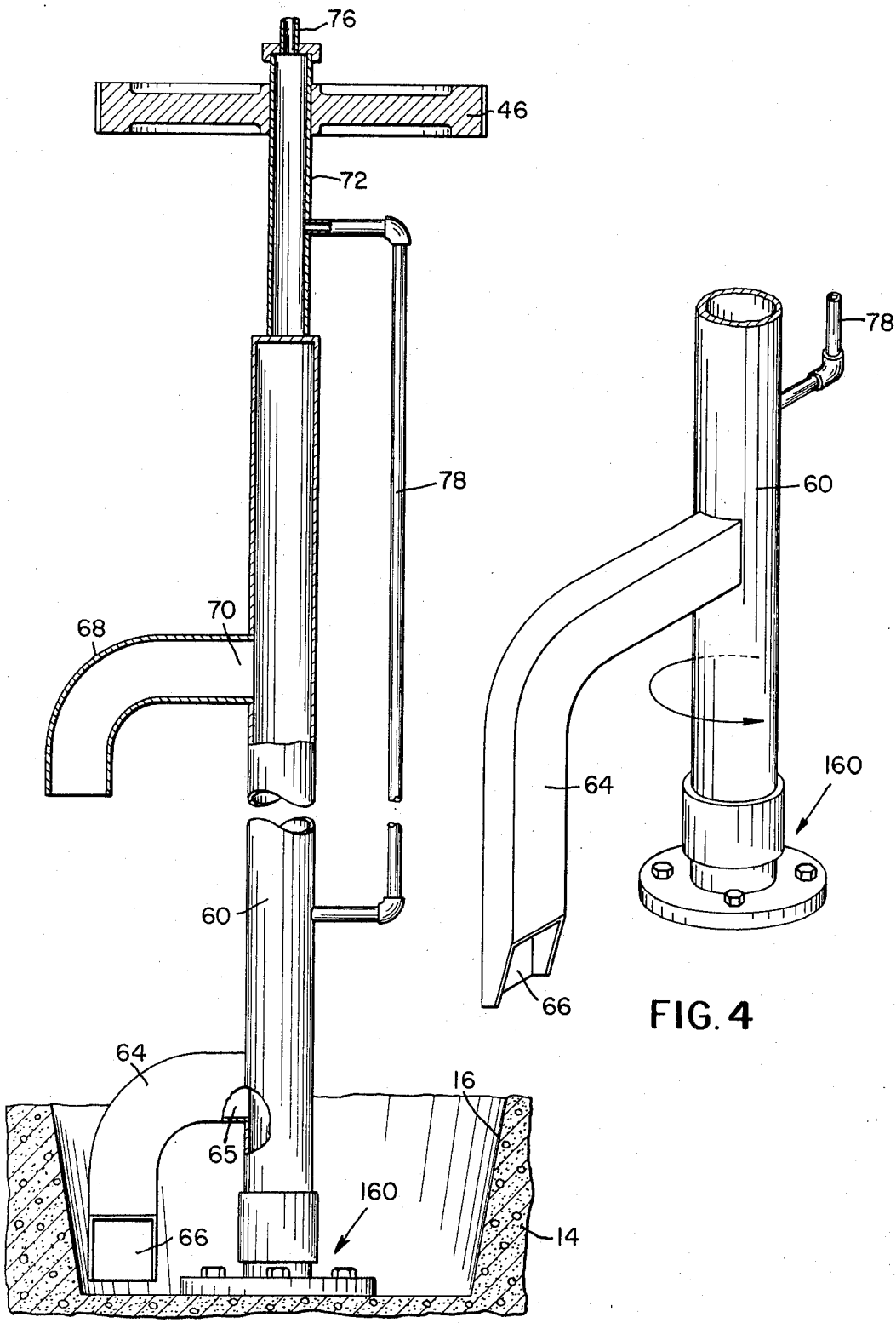
FIG. 3 is a vertical elevational view partly in section on enlarged scale of the sludge pick-up means embodied in the apparatus depicted in FIGS. 1 and 2.
FIG. 4 is a perspective view of the pick-up or suction branch of the sludge pick-up means depicted in FIG. 3.

Turning now to a description of the sludge lifting tube assembly 50, reference is for this purpose made to FIG. 3 which shows a vertical elevational view partly in section of such assembly, it being understood that such assembly provides supporting means for the rotary raking structure 30 with the latter having collars 56, 58 which are secured to the sludge lifting tube assembly (FIG. 1) and the assembly in turn being rotatably supported on a suitable bearing plate unit 160 in sludge hopper 16. The sludge lifting tube assembly comprises an upright pipe structure 60 having at its lower end a suction branch 64 which communicates with pipe structure 60 through opening 65 and includes a suction entry opening as at 66 which during the course of rotation of the sludge lifting tube assembly rotates in the sludge hopper so that sludge thereby is scooped into the suction branch 64. Adjacent the upper end of the assembly is a discharge branch 68 having a terminal spout portion 69 which also communicates with the pipe structure 50 through opening 70. Fixed to the top of the sludge lifting tube assembly is a drive shaft 72 on which is carried the bull gear 46 and through which drive of the raking structure 30 and the sludge lifting tube assembly 50 is affected. The drive shaft 72 is hollow for reasons as will be given. With reference to FIG. 1, there is provided on the bridge structure 40 an air compressor unit 74 constituting a source of compressed air which air in turn can be delivered to the lift tube assembly 50 by means of piping 76 communicating the interior of the hollow drive shaft 72 with the source of compressed air and a further air supply conduit 78 which outlets from the hollow drive shaft and extends downwardly to a point of introduction of such air pipe conduit 78 into the sludge lifting tube assembly pipe structure 60, such point of entry being at a location in the suction lifting tube assembly conduit intermediate the suction and discharge branches thereof. By supplying air from the compressor 74 to the sludge lift tube assembly 50, there is created an airlift withdrawal of sludge from the sludge hopper 16 upwardly in the lifting tube assembly and ultimately outwardly therefrom through the discharge branch 68. Thus, the sludge lifting tube assembly provides a convenient, inexpensive and reliable means for removing sludge from the sludge hopper.

As indicated earlier, it is desirable to be able to alter, distribute or apportion the outflow of sludge from the sedimentation tank hopper 16 to various system destinations depending upon the particular requirements of the sewage system. Thus, for example, as can be seen in FIGS. 1 and 2, the tank 12 is connected by means of a conduit 80 with a sluge recovery operation (conduit 80, for example, returning activated sludge to the secondary aeration tanks), and by means of a second conduit 82 which is connected with a waste sludge disposal operation. It is the flow of secondary sludge to the respective two conduits 80 and 82 which it is desired on occasion to distributing between amounts varying, e.g., from 0 to 100 percent flow through said conduits. For the purpose of distributing such flow, the apparatus of the present invention provides in addition to the sludge lifting tube assembly 50 the distributing or apportioning means 100 depicted in FIG. 5.

Turning now to the apportioning means 100 shown in FIG. 5, it includes an annular trough 102 having outer and inner walls 104 and 106, respectively, as well as the trough base 108 extending therebetween. The conduits 80 and 82 associated with sludge recovery and waste sludge disposal extend into the tank as shown in FIGS. 1, 2 and 5 and terminate in communication with the compartment defined by the annular trough 102, the open ends of such pipes being located at the inner side of the trough outer wall 104 to establish such communication. The annular trough 102 is supported in fixed location in the tank 12 in an encircling position around the rotating sludge lifting tube assembly 50 as can be best seen in FIG. 1. As shown in FIGS. 1 and 5, the discharge branch 68 of the latter assembly is located to discharge the sludge picked up therewith into the collection space provided by the annular trough, so that as the sludge lifting tube assembly rotates there will issue therefrom a continuous discharge of sludge into the annular trough.

The distribution of outflow of such sludge from the annular trough 102 to the conduits 80 and 82 is effected by employing flow control means conveniently provided as plates 112 which can be selectively removably positioned in the structure of the trough 102 to completely bar flow to either or both of the conduits 80 and 82, or to divide delivery of the outflow from the branch in the trough in such manner that a specified portion thereof will enter the conduit 80 and the remainder will enter the conduit 82. In furtherance of this end, the inside surface of the trough outer wall 104 is provided at a number of locations with flow control plate receiving brackets 110. Further, a divider plate 114 is fixed in the trough in position extending between the trough walls 104 and 106 to comprise means along with a removable plate 112 for dividing the collection space thereof into two separate collection spaces of selectively variable volume, one each being in communication with the respective two conduits 80 and 82. Accordingly, if a flow control plate 112 is inserted in the brackets associated with the position D, such plate 112 with the fixed plate 114 effectively establishes in trough 102 a first compartment communicating with pipe 82 and in such size in respect of the remainder of compartment Y of the trough 102 which communicates with pipe 80 as to allow for discharge through pipe 82 of only 10 percent of the sludge issuing from discharge branch 68, such discharge being to a waste sludge disposal. With the plate 112 in position D, the remainder of the sludge issuing from discharge branch 68 enters the other collection space Y and discharges from the trough through conduit 80, such discharge amounting to 90 percent of the flow from branch 68 and being recovered for use in the secondary aeration tank. On the other hand if the flow control plate is inserted in the brackets associated with position E, it will then together with the fixed plate 114 define a collection space representing 15 percent of the outflow from the discharge branch 68 so that accordingly 15 percent of the sludge will be conveyed through pipe conduit 82 to the waste sludge disposal operation with the remaining 85 percent being directed through the sludge recovery line 80. Flow from both the sludge return and waste sludge lines is of course effected by means of gravity, there being no need for an intermediary pumping means to convey such flows to their ultimate system destinations.

If it is desired to selectively shut-off completely the flow to either of conduits 80 and 82, the same can be effected by inserting a flow control plate 112 in the brackets 110 at the designated locations A, B depending upon which conduit is to be blocked and such plates will cover the entrance openings to the conduits. Thus, if a plate is inserted in position B, accordingly all flow entering the trough 102 from the discharge branch 68 will exit from the trough through the conduit 80 and be returned to the aeration tank. On the other hand, if a flow control plate 112 is positioned in portion A, all outflow of sludge from trough 102 will occur through conduit 82 associated with waste sludge disposal. The below listed table gives the apportioned flow values in conduits 80, 82 depending on the positioning of the plate 112.

| PLATE POSITION | RECOVERY OF SLUDGE % | WASTE SLUDGE % |
| --- | --- | --- |
| A | 0 | 100 |
| B | 100 | 0 |
| C | 95 | 5 |
| D | 90 | 10 |
| E | 85 | 15 |
| F | 80 | 20 |
| G | 75 | 25 |

It will be apparent that in respect of the apparatus of the present invention, it is possible to produce still other embodiments thereof without departing from the scope of the inventive concept herein disclosed, and accordingly, it should be understood that all matter contained in the above description and in the accompanying drawings should be interpreted as illustrative and not in a limiting sense.

What is claimed is:

1. In a sedimentation apparatus including a tank having a base and an encircling side wall,
   means for supplying a sludge containing influent to said tank, said tank having a sludge hopper in said base,
   means for maintaining a predetermined fluid level in said tank,
   means in said tank for collecting and transporting sludge settling on said base to a common location in said sludge hopper, said means including a rotary raking structure supported in said tank for rotation about the central vertical axis of said tank,
   sludge pick-up means for removing sludge of substantially uniform consistency from said common location,
   a rotating spout means connected to said sludge pick-up means for discharging said sludge of substantially uniform consistency to a means for distributing the sludge of substantially uniform consistency from said common location to a first conduit and a second conduit, said distributing means comprising an annular trough fixed to said tank, said first and second conduits being connected to said trough, said trough including flow proportioning structure for selectively, proportionately controlling the quantity of flow of said sludge of substantially uniform consistency to said first and second conduits.

2. The apparatus of claim 1 wherein said first conduit connects said tank to a sludge recovery operation and said second conduit connects said tank to a waste sludge operation.

3. The apparatus of claim 2 wherein said flow proportioning structure comprises flow control plates selectively removably positionable in said trough in certain positions for completely blocking off flow from said trough to said first conduit and diverting all flow to said second conduit and vice versa, and in other positions for apportioning out flow from said trough to both said conduits.

4. The apparatus of claim 3 wherein said annular trough defines a collection space and has inner and outer walls and a floor extending therebetween, said first and second conduits having ends thereof extending through said outer wall with the conduit end opening of each in communication with said trough space.

5. The apparatus of claim 4 wherein said trough is provided on said outer wall with plate retainer means for removably holding flow control plates in covering position over the end openings of both said conduits thereby preventing outflow from the trough to said conduits.

6. The apparatus of claim 5 wherein said sluge pickup means includes a sludge lifting tube assembly connected with said raking structure and rotatable therewith, said sludge lifting tube assembly having a section branch communicatively extending in said sludge hopper, spout means having an outlet therefrom above said fluid level, for discharging said sludge of substantially uniform consistency into said trough during rotation of said lifting tube assembly with said raking structure.

7. The apparatus of claim 6 wherein said trough is provided with a fixed plate extending between the inner and outer trough walls, and plate retaining means on both said inner and outer trough walls for removably holding a flow control plate between said inner and outer walls cooperating with said fixed plate to segregate said trough into a first collection portion communicating with said first conduit, and a second collection portion communicating with said second conduit, the selective positioning of the last-mentioned flow control plate within said trough correspondingly apportionately controlling the sludge discharge to said first and second compartments.

8. The apparatus of claim 6 wherein said sludge pickup means further comprises a source of compressed air, and means for supplying compressed air from said source to said suction lifting tube assembly to provide an airlift withdrawal of sludge from said sludge hopper to said sludge lifting tube assembly.

* * * * *